United States Patent [19]

Koiwa et al.

[11] Patent Number: 5,107,248
[45] Date of Patent: Apr. 21, 1992

[54] OIL-PRESSURE WARNING APPARATUS FOR AUTOMOBILES

[75] Inventors: Atsushi Koiwa; Takafumi Ichikawa, both of Aichi; Hiroshi Furuhashi, Shizuoka, all of Japan

[73] Assignees: Kabushiki Kaisha Tokai Rika Denki Seisakusho, Niwa; Suzuki Motor Corporation, Shizuoka, both of Japan

[21] Appl. No.: 581,926

[22] Filed: Sep. 13, 1990

[30] Foreign Application Priority Data

Sep. 26, 1989 [JP] Japan .............................. 1-112286[U]
Sep. 26, 1989 [JP] Japan .............................. 1-112287[U]
Sep. 26, 1989 [JP] Japan .............................. 1-112288[U]

[51] Int. Cl.$^5$ ............................................. G08B 21/00
[52] U.S. Cl. ..................................... 340/451; 340/626
[58] Field of Search ............... 340/451, 459, 438, 626, 340/461

[56] References Cited

U.S. PATENT DOCUMENTS

| | | | |
|---|---|---|---|
| 2,728,903 | 12/1955 | Myers | 340/451 |
| 3,119,991 | 1/1964 | Nallinger | 340/626 X |
| 3,866,166 | 2/1975 | Kerscher, III et al. | 340/462 |
| 3,906,440 | 9/1975 | Haupt | 340/451 X |
| 3,927,390 | 12/1975 | Hill | 340/451 |
| 4,021,794 | 5/1977 | Carlson | 340/451 X |
| 4,984,543 | 1/1991 | Tharman | 340/451 X |

Primary Examiner—Jin F. Ng
Assistant Examiner—Brian R. Tumm
Attorney, Agent, or Firm—Finnegan, Henderson, Farabow, Garrett and Dunner

[57] ABSTRACT

An oil-pressure warning apparatus for automobiles includes an oil-pressure switch which is turned on when the circulation pressure of engine oil drops below a predetermined level, an alarm circuit which provides an electrical path in response to the on-off operation of the oil-pressure switch, and a warning control circuit which energizes the alarm circuit when the oil-pressure switch is turned on and maintains the energization of the alarm circuit. Thus, even when the oil pressure switch fluctuates back and forth between its on and off positions, the warning lamp will not flash.

5 Claims, 5 Drawing Sheets

OIL-PRESSURE WARNING APPARATUS FOR AUTOMOBILES

BACKGROUND OF THE INVENTION

The present invention relates to an oil-pressure warning apparatus for alarming when the circulation pressure of engine oil drops.

Conventionally, these types of apparatuses are of the construction in which an oil-pressure switch 1 is connected in series with a vehicle-carried battery 4 via a warning lamp 2 as warning means and an ignition switch 3. When the circulation pressure of engine oil has dropped below a predetermined level, the oil-pressure switch 1 is turned on to cause the warning lamp 2 to light up. Thus, if the engine is normally operating and the circulation pressure of engine oil is higher than a predetermined level, the warning lamp 2 is. If the oil pressure drops due to, for example, a decrease in the amount of oil, the oil pressure switch 1 is turned on to cause the warning lamp 2 to light up, thus warning the user.

Practically, the circulation pressure of engine oil of an actual automobile varies in accordance with the operating conditions of the engine. With the above-mentioned construction, if a change in circulation oil pressure occurs just below or above the predetermined level, the oil pressure switch 1 opens and closes in response to the variations of the pressure, causing the warning lamp 2 to flash intermittently, in which case the flashing may stop due to the fact that the circulation pressure becomes temporarily higher than the predetermined level, allowing the warning lamp 2 to light out. Thus, the conventional apparatus suffers from the drawbacks in that it is difficult for the users to identify whether the temporary flashing is really a warning of the decreased circulation pressure of engine oil.

SUMMARY OF THE INVENTION

The present invention was made to overcome the above-described drawbacks. An object of the invention is to provide an oil pressure warning apparatus for automobiles in which even when the oil-pressure switch is repeatedly turned on and off in the vicinity of a predetermined threshold level of oil pressure due to a temporary drop of circulation pressure of engine oil, the user is warned of the decrease of oil pressure without unstable flashing of the Warning lamp.

A first oil pressure warning apparatus of the invention comprises:

an oil-pressure switch which is turned on when the circulation pressure of engine oil decreases below a predetermined level;

alarm means which is supplied electric power in accordance with the on-off operation of the oil-pressure switch after a main power is turned on;

delay means for outputting an enable signal a predetermined length of time after the oil-pressure switch is turned off; and a warning-control circuit for electrically energizing the alarm means when the oil-pressure switch is turned on while the delay means supplies the actuation signal to the warning-control circuit, and for continuing to energize the alarm means while the main power is turned on.

A second oil pressure warning apparatus of the invention comprises:

an oil-pressure switch which is turned on when the circulation pressure of engine oil decreases below a predetermined level;

alarm means which is supplied electric power in accordance with an on and off operations of the oil-pressure switch after a main power is turned on;

condition detecting means for outputting a detection signal while an engine is operating;

delay means for outputting an enable signal a predetermined time length after the detection signal is supplied thereto from the detecting means; and a warning-control circuit for providing a new electrical path by a switching element in response to an inverted level signal which is outputted from the oil-pressure switch when the oil-pressure switch is turned on while the enable signal is supplied from the delay means, and for maintaining the new electrical path while the enable signal is outputted.

A third oil pressure warning apparatus of the invention comprises:

an oil-pressure switch which is turned on when an circulation pressure of engine oil decreases below a predetermined level;

alarm means which is supplied electric power in accordance with the on and off operations of the oil-pressure switch after a power is turned on;

detecting means for outputting a detection signal while an engine is operating;

delay means for outputting an enable signal a predetermined time length after the detection signal is supplied thereto from the detecting means when the detection signal is stopped; and initialization means for causing the delay means to immediately stop outputting the enable signal; and a warning-control circuit for electrically energizing the alarm means by a relay when the oil-pressure switch is turned on while the enable signal is supplied from the delay means to the warning-control circuit, and for maintaining the relay in self holding condition while the enable signal is outputted.

According to the first oil pressure warning apparatus of the present invention, under the condition of that the engine is not operating with the power supply turned on, if the circulation pressure of engine oil is below a predetermined level, the oil-pressure switch is turned on to cause the alarm means to establish an electrical path to the alarm means. When the engine is started and normally operates, the circulation pressure of engine oil exceeds a predetermined level to turn off the oil-pressure switch, shutting off the power to the alarm means. The enable signal is issued from the delay means a predetermined time length after the oil-pressure switch is turned off, thus the warning-control circuit is ready to operate. Setting the warning control circuit ready to operate after a predetermined time length prevents the warning control circuit from malfunctioning even when the oil-pressure switch shifts to its off condition through so-called chattering action in which the switch fluctuates back and forth between its on and off positions. Thus, when the warning control circuit becomes ready to operate, it supplies power to the alarm means for activating alarm operation thereof in response to the on-operation of the oil-pressure switch. The warning control circuit continues to supply power to the alarm means while the main power is turned on. Thus, for example, even when the oil-pressure switch fluctuates back and forth between its on and off positions, the alarm means remains supplied with power, thus warning the user of decreased circulation pressure of engine oil.

According to the second oil pressure warning apparatus of the present invention, with the power supply turned on, when the engine is not operating, the circulation pressure of engine oil is below a predetermined level, thus the oil-pressure switch is on for causing the alarm means to establish an electrical path to the alarm means.

When the engine is started and operates, the condition detecting means detects the rotation of the engine to output a detection signal. If the circulation pressure of engine oil is in a normal condition where the pressure is higher than a predetermined level, the oil-pressure switch is turned off. A predetermined time length after the detection signal is outputted, the delay means outputs an enable signal and the warning control circuit becomes ready to operate. At this time, even if the circulation pressure is such that the oil-pressure switch tends to shift to its off position through chattering, the warning control circuit will not start to operate because a predetermined length of time has not elapsed yet. Under the condition that the enable signal is outputted, when the oil-pressure switch is turned on to output an inverted level signal, the warning control circuit establishes a new electrical path to the alarm means via a switching element, thereby causing the alarm operation as well as holding the new electrical path established while the enable signal is outputted from the delay means. Thus, for example, even when the oil-pressure switch fluctuates back and forth between its on and off positions due to the fluctuation of the circulation pressure of engine oil, the alarm means remains supplied with the power, ensuring that the user is warned of the decreased circulation pressure of engine oil.

When the engine is stopped, the condition detecting means stops to output the condition detection signal, which causes the delay means to stop outputting the enable signal. Thus, the warning control circuit is set inoperative, the alarm means is now energized only through the on and off operation of the oil-pressure switch. Therefore, for example, when the user restarts the engine after engine failure, the warning control circuit will not continue to energize the alarm means. This is easy to use.

According to the third oil pressure warning apparatus of the invention, with the main power turned on, when the engine is not operating, the oil-pressure switch is turned on to establish an electrical path to the alarm means. When the engine is started to operate, the condition detecting means detects the operation of engine to output a detection signal. If the engine is in the normal condition where the circulation pressure of engine oil is higher than predetermined level, the oil-pressure switch is turned off.

The delay means outputs an enable signal a predetermined time length after the detection signal is outputted, thereby rendering the warning control circuit ready to operate. Even if the oil-pressure switch shifts to its off condition through chattering where the oil-pressure switch fluctuates back and forth between its on and off positions, the warning control circuit will not malfunction. Thus, under the condition that the enable signal supplied to the warning control circuit, when the oil-pressure switch is turned on, the warning control circuit supplies power to the alarm means via a relay to allow the alarm means to perform alarm operation, and continues to supply power via the relay so that the power is supplied to the alarm means while the enable signal is outputted from the delay means. Thus, even if the oil-pressure switch fluctuates back and forth through its on and off positions due to the fluctuation of circulation pressure of the engine oil, the alarm means remains supplied power thereto, ensuring alarm operation of the decreased circulation pressure of engine oil.

When the engine is stopped, the condition detecting means stops outputting the condition detection signal, the initialization means causes the delay means to immediately stop outputting the enable signal. This cancels the operative condition of warning control circuit, the alarm means is energized only through the on or off operation of the oil-pressure switch. Therefore, for example, when the user restarts the engine after engine failure, the warning control circuit will not continue to energize the alarm means since the energization of the alarm means has been canceled.

DETAILED DESCRIPTION OF THE PREFERRED EMBODIMENTS

A first embodiment of the present invention will now be described with reference to FIG. 2.

Figure 1:
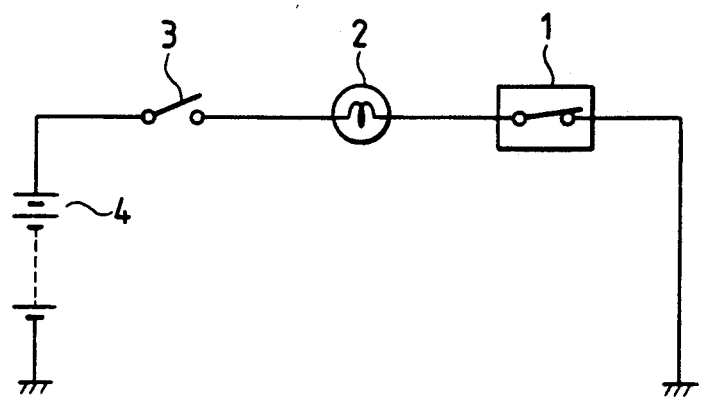
FIG. 1 is a circuit diagram showing a conventional oil-pressure warning apparatus.
Figure 2:
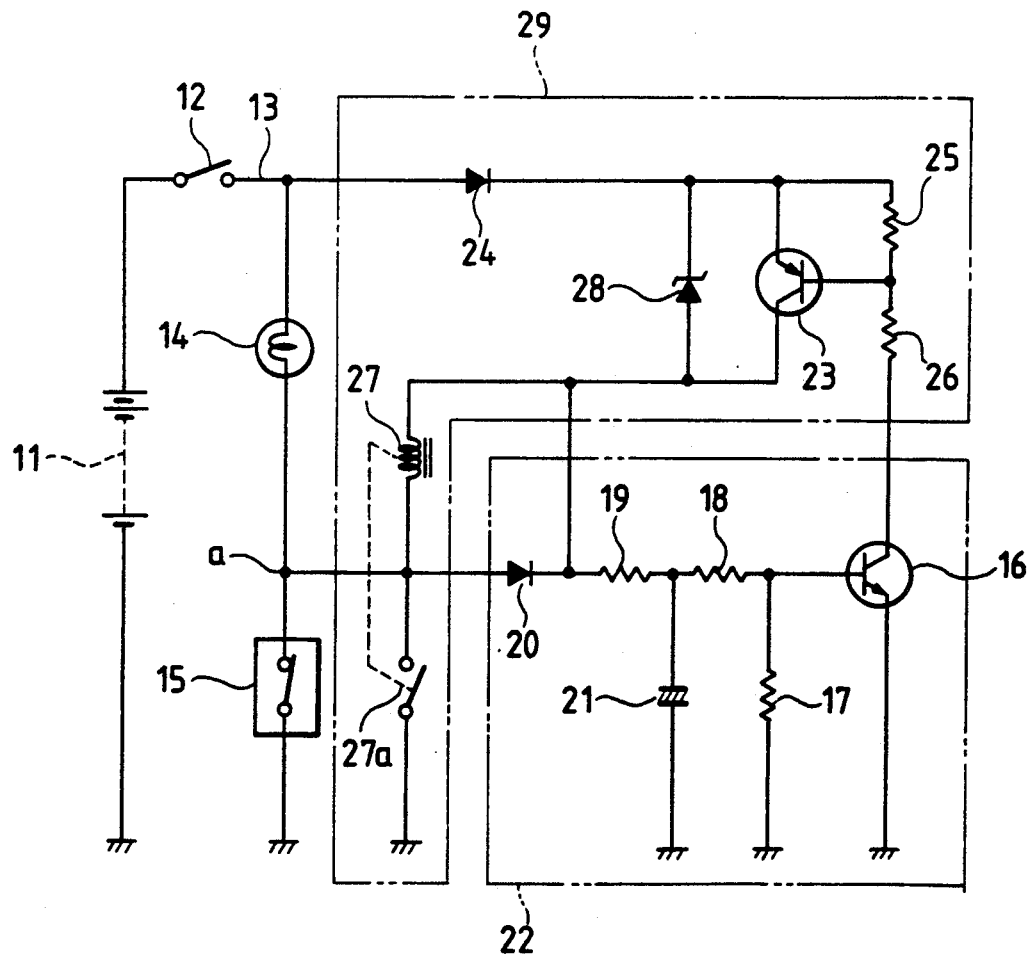
FIG. 2 is a circuit diagram showing a first embodiment of the present invention.

FIG. 2 is a schematic diagram of the first embodiment. A battery 11 mounted on a vehicle is grounded at a negative terminal and is connected at a positive terminal to a dc power line 13 via an ignition switch 12. A warning lamp 14 serves as an alarm means, and is connected at one end to the dc power line 13 and at other end, which serves as a detection terminal a, to ground via an oil-pressure switch 15. The oil-pressure switch 15 is turned off when the engine is started as well as when the circulation pressure of engine oil exceeds a predetermined level.

A transistor 16 is of an NPN type and its emitter is grounded. The base of the transistor 16 is grounded through a resistor 17 while also being connected to the detection terminal a via resistors 18 and 19 and a reverse-current blocking diode 20 with a polarity shown. A charging capacitor 21 is placed between ground and the junction point of the resistors 18 and 19. The above-described circuit connection completes a signal-delaying circuit 22 which serves as a delay means. The signal-delaying circuit 22 starts to charge the capacitor 21 through the warning lamp 14, diode 20, and resistor 19 when the oil pressure switch 15 is turned off to turn the detection terminal a from L level to H level, and supplies a drive voltage to the base of the transistor 16 after elapse of a predetermined length of time (for example, 0.5 to 1 second). In the present specification, the condition such that the transistor 16 is turned on and the collector voltage goes low corresponds to the condition of outputting of the enable signal.

A transistor 23 is of a PNP type and its emitter is connected to the dc power line 13 via a reverse-current blocking diode 24 of a polarity shown. The base of the transistor 23 is connected to the emitter thereof via a resistor 25 while also being connected to the collector of transistor 16 through a resistor 26. The collector of the transistor 23 is grounded through a relay 27 and a normally open relay contact 27a. The junction point between the relay 27 and the relay contact 27a is connected to the aforementioned detection terminal a. A zener diode 28 having the polarity shown is inserted between the emitter and collector of the transistor 23 and serves to protect the transistor from overvoltages. The above-described circuit connection completes a warning control circuit 29.

The operation of the first embodiment will now be described.

With the ignition switch 12 turned on, when the engine has not started yet, the oil pressure switch 15 is turned on because the circulation pressure of engine oil is below a predetermined level. In this case, a current flows through the ignition switch 12 and oil pressure switch 15 from the battery 11 mounted on the vehicle to turn on the warning lamp 14. At this time, since the oil pressure switch 15 is turned on to set the detection terminal a to the L level, the capacitor 21 in the signal-delay circuit 22 is not charged. Therefore, the transistor 16 is in the off condition. Thus, the transistor 23 in the warning control circuit 29 is also in the off condition.

In the above-mentioned condition, when the engine is started, the oil pump is driven and the circulation pressure of engine oil exceeds the predetermined value causing the oil pressure switch 15 to be turned off. Then, the warning lamp 14 is turned off and the detection terminal a turns to the H level to start charging the capacitor 21. Thereafter, when a drive voltage is applied to the base of the transistor 16 from the capacitor 21 after elapse of a predetermined time, the transistor 16 turns on so that the collector voltage turns to the L level. As a result, the base of the transistor 23 in the warning control circuit 29 is applied a drive voltage through a resistor 25, thus the transistor 23 becomes operative. In other words, if a voltage is applied across the collector and emitter of the transistor 23, the transistor 23 goes on and a current flows therethrough. At this time, a current which is essentially equal to the base current of the transistor 16 flows through the warning lamp 14 but the magnitude of the current is too small to light up the warning lamp 14. Since the warning control circuit 29 becomes ready to operate after elapse of a predetermined length of time, the warning control circuit 29 will not malfunction even if the oil pressure switch 15 undergoes chattering where the switch 15 fluctuates back and forth between its on and off positions.

In this manner, when the circulation pressure of engine oil drops below the predetermined level due to a decrease in engine oil amount, the oil pressure switch 15 is turned on. At this time, the warning lamp 14 is energized to light up while a voltage is applied through the relay 27 across the emitter and collector of the transistor 23 in the warning control circuit 29. The transistor 23 the relay energizes to close the relay contact 27a. Thus, the relay contact 27a also provides an energizing path for the warning lamp 14. With this condition, while the ignition switch 12 is turned on, the transistor 23 is held on, thus the relay contact 27a remains closed. That is, thereafter, even if the oil-pressure switch fluctuates between its on and off conditions, the warning lamp 14 continues to light up. The warning lamp will not fluctuate between its on and off conditions even though the oil pressure switch 15 fluctuates, ensuring that the user is warned of the decrease of the circulation pressure of engine oil. Thus, it is convenient to the user.

With the aforementioned embodiment, while the capacitor 21 in the signal-delaying circuit 22 is charged up through the warning lamp 14, the embodiment is only exemplary and may be arranged to be charged from another power source.

A second embodiment of the present invention will now be described with reference to FIG. 3A.

Figure 3A:
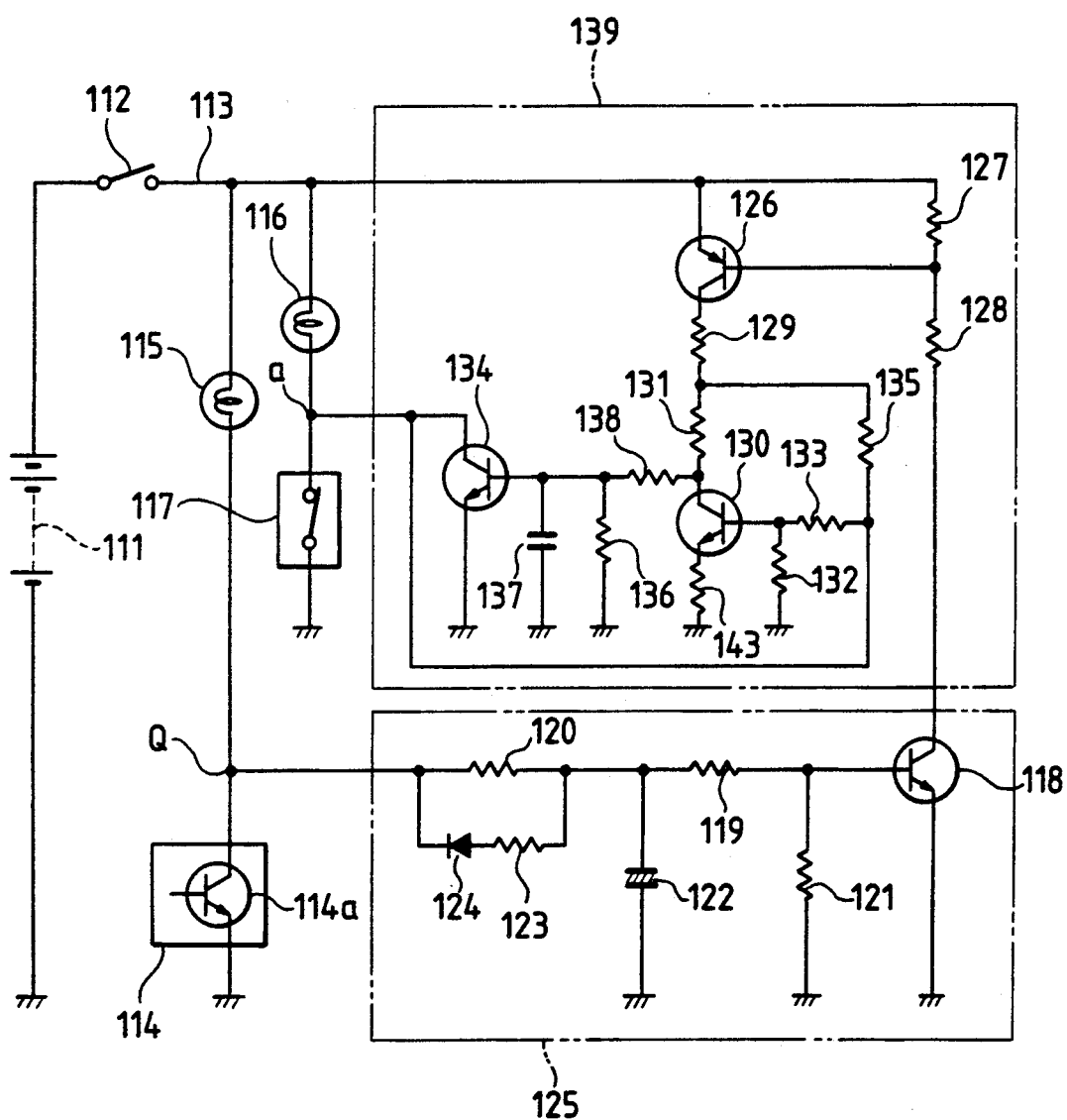
FIGS. 3A and 3B are circuit diagrams showing a second embodiment of the present invention.

FIG. 3A is a circuit diagram of the second embodiment.

A battery 111 mounted on a vehicle is grounded at a negative terminal and is connected at a positive terminal to a dc power line 113 via an ignition switch 112. A charge lamp controller 114 serves as a condition detecting means, and the collector of an output stage transistor 114a functions as an output terminal Q and is connected to the dc power line 113. With power supplied thereto, the charge lamp controller 114 detects the rotation of engine to switch the transistor 114a from on condition to off condition so as to invert the voltage of the output terminal Q from the ground level to the positive terminal voltage of the battery 111. In this specification, the voltage signal outputted from the terminal Q is referred to as a detection signal. A warning lamp 116 is connected at its one end to the dc power line 113 and the other end of the warning lamp 116 serves as a detection terminal a grounded via an oil pressure switch 117. The oil-pressure switch 117 is adapted to open when the engine is started and the circulation pressure of engine oil exceeds a predetermined level.

A NPN type transistor 118 has its base connected via resistors 119 and 120 to the output terminal Q of the aforementioned charge lamp controller 114 while also being grounded through a resistor 121. A charging capacitor 122 is connected across ground and the junction point between the resistors 119 and 120. A series circuit of a discharge resistor 123 and a diode 124 with a polarity shown, is connected in parallel with the resistor 120. The above-described circuit connection completes a signal-delaying circuit 125. When the signal-delaying circuit 125 receives an H level signal from the output terminal Q of the charging lamp controller 114, the circuit 125 begins to charge the capacitor 122 via the resistor 120, and after elapse of a predetermined length of time, the capacitor 122 supplies a base bias voltage to a transistor 118. In this specification, the condition such that the transistor 118 is turned on and the collector voltage goes to the L level, refers to the condition of outputting of an enable signal. When the transistor 114a of the charge lamp controller 114 turns on to bring the output terminal Q into the L level, the charge stored across the capacitor 122 is discharged in a short time (e.g., 0.1 to 0.5 seconds) through the resistor 123, diode 124, and transistor 114.

A PNP type transistor 126 is connected at its emitter to the dc power line 113 and at its base to the collector of the transistor 118 via a resistor 128. The collector of the transistor 126 is connected to one end of a resistor 129. An NPN transistor 130 has its emitter grounded via a resistor 143 and its collector connected to one end of the aforementioned resistor 129 via the resistor 131. The base of the transistor 130 is grounded via a resistor 132 while also being connected to the detection terminal a via a resistor 133. An NPN type transistor 134 acts as a switching element and has its collector connected through a resistor 135 to the junction point between the resistors 129 and 131. The base of the transistor 134 is grounded via a parallel circuit of a resistor 136 and a capacitor 137 while also being connected to the collector of the transistor 130 via a resistor 138. The above-described connection completes a warning control circuit 139.

The operation of the second embodiment will now be described.

With the ignition switch 112 turned on, when the engine has not been started yet, the oil-pressure switch 117 is turned on due to the fact that the circulation pressure of engine oil is below a predetermined level. Therefore, the warning lamp 116 is energized by the battery 111 through the ignition switch 112 and oil-pressure switch 117. At this time, the output transistor 114a in the charge lamp controller 114 is in the turned on condition, thus the output terminal Q is in the L level due to the fact that the engine is not operating. This allows the charge lamp 115 to light up. In this case, the capacitor 122 is not charged due to the fact that the output terminal Q of the charge lamp controller 114 is at the L level, thus the transistor 118 is in its off condition. Thus, the transistor 126 in the warning control circuit 139 is also in the off condition.

With the above-described condition, when the engine is started, in the normal condition, the charge lamp controller 114 detects the rotation of engine and turns off the transistor 114a of the output stage so that the output terminal Q is brought to the H level. This shuts off the power to the charge lamp 115 to cause it to light out. The capacitor 122 of the signal-delaying circuit 125 begins to be charged through a resistor 120 since the output terminal Q of the charge lamp controller 114 goes to the H level. A small amount of current flows through the charge lamp 115 but the magnitude thereof is negligible so that the charge lamp 115 will not light up. In the mean time, when the circulation pressure of engine oil increases above a predetermined level after the engine is started, the oil pressure switch 117 is turned off to light out the warning lamp 116. At this time, the detection terminal a turns from the L level to the H level. Each base of the transistors 130 and 134 are applied with the voltage, but the base potential of transistor 134 does not reach the driving voltage until &he capacitor 137 is charged. Therefore, first the transistor 130 is turned on. When the transistor 130 is on, since the collector current of the transistor 130 flows through resistors 131 and 135, the warning lamp 116 is not turned on. Since the transistor 130 goes on to bring the collector thereof down to the L level, the capacitor 137 is discharged. This removes the base drive voltage of the transistor 134 to maintain the transistor 134 off. Thus, even if the oil pressure switch 117 shifts to its off condition through chattering, the warning lamp 116 will not light up continuously. After elapse of a predetermined time, the transistor 118 in the signal-delaying circuit 125 is supplied with a drive voltage to the base from the capacitor 122 to be turned on. Thus, the transistor 126 in the warning control circuit 139 is supplied a base drive voltage through a resistor 127 to turn on. The transistor 130 is on as mentioned above, and remains on without regard to the fact that the transistor 126 turns on.

With this condition, when the circulation pressure of engine oil decreases to a level below a predetermined value due to a decrease in the amount of engine oil, the oil-pressure switch 117 is turned on so that the detection terminal a turns to the L level (referred to as an inverted level signal in this specification) while also energizing the warning lamp 116.

Thus, since the base voltage of the transistor 130 in the warning control circuit 139 goes low via the resistor 133, the transistor 130 goes off through the resistor 133 to bring the collector thereof to the H level. As a result, the transistor 134 is supplied its base drive voltage through the resistors 138 and 136 to turn on so that a new electrical path to the warning lamp 116 is established. This electrical path is held while the transistors 126 and 118 are on, i.e., while the engine is operating regardless of subsequent on and off operation of the oil-pressure switch 117. The warning lamp 116 also continues to light up. Therefore, even if the circulation pressure of engine oil is at a level where the oil-pressure switch 117 tends to fluctuate back and forth between its on and off positions, the warning lamp 116 will not fluctuate together with the switch 117. Accordingly, the user is certainly warned of the decreased circulation pressure of engine oil.

While the alarm operation is being performed by the above-mentioned warning control circuit 139, if the engine stops, for example, due to engine failure, the transistor 114a of the charge lamp controller 114 turns on to bring the voltage at the output terminal Q to the L level. Thus, the charge lamp 115 is energized to light up while the capacitor 122 in the signal-delaying circuit 125 discharges through the resistor 123, diode 124 and transistor 114a. Then, the transistor 118 in the signal-delaying circuit 125 turns off, which causes the transistor 126 in the warning control circuit 139 to turn off. Thus, the transistor 134 is no longer supplied its base drive voltage and therefore turns off, cutting off the electrical path to the warning lamp 116. In the mean time, since the decreased circulation pressure due to the stoppage of engine causes the oil-pressure switch 117 to turn on, the oil pressure switch 117 now provides the warning lamp 116 with an electrical path so that the warning lamp 116 is energized to light up just as before the engine is started. Therefore, when the user restarts the engine after engine failure, the warning control circuit 139 had brought the transistor 134 into the off condition, ensuring that the user restarts the engine from the initial condition. This is very convenient to the user.

Figure 3B:
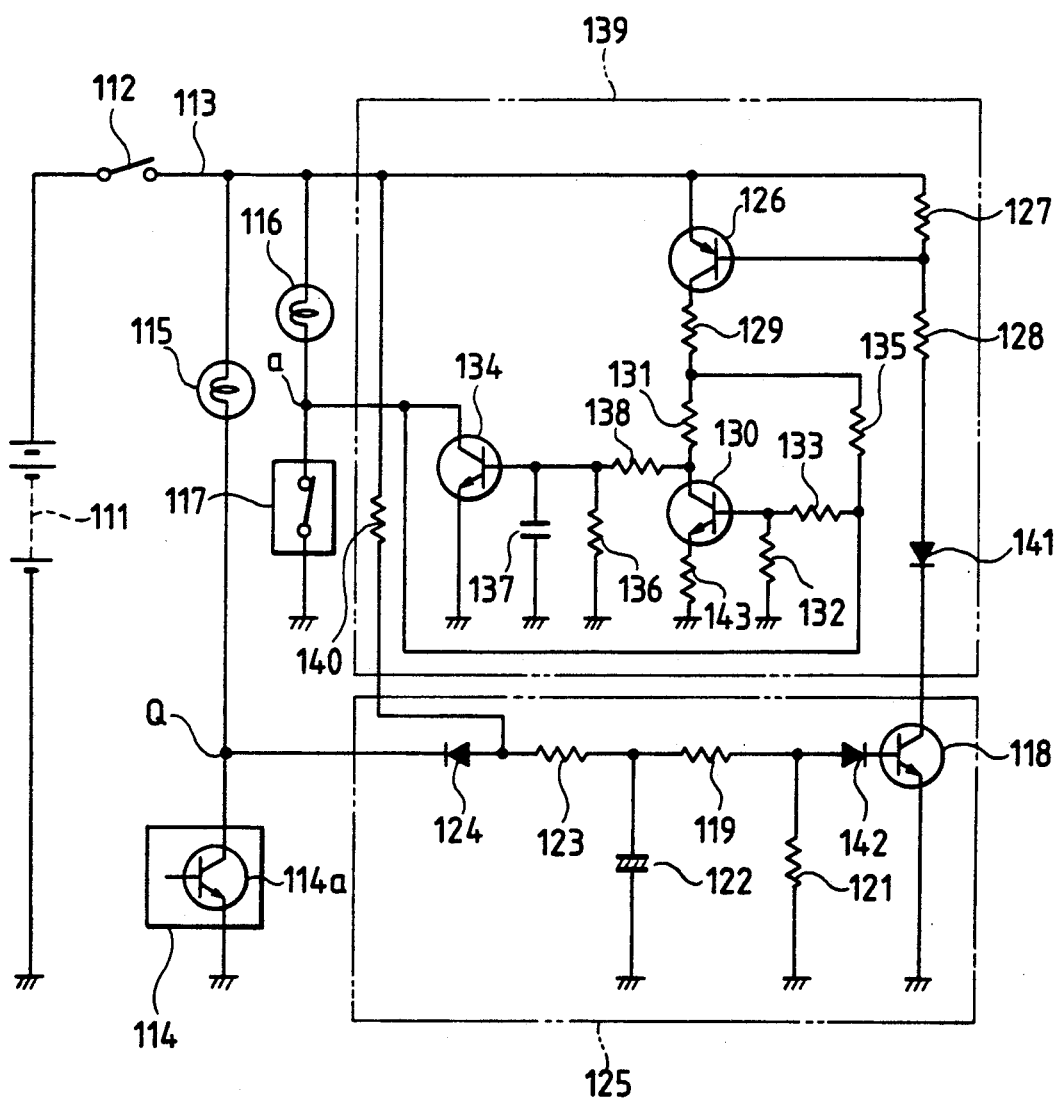

FIG. 3B shows a modification of the second embodiment, which is the same as the previously described second embodiment except that a resistor 140 is placed, instead of the resistor 120, between the dc power line 113 and the junction point between the diode 124 and the resistor 123. In this modification in FIG. 3B, reverse current blocking diodes 141 and 142 of the polarity shown are inserted into the collector and base of the transistor 118, respectively.

In FIG. 3B, when the output terminal Q of the charge lamp controller 114 turns to the H level after the engine is started, the capacitor 122 in the signal-delaying circuit 125 is charged through the resistors 140 and 123, thus exhibiting the same operation and effects as the previously mentioned second embodiment. Arranging the apparatus this way eliminates any problems related to the charging operation of capacitor 122 even if some troubles happen to the charging lamp 115.

Although the above-described modification has been described with respect to the arrangement in which the charge lamp controller 114 also serves as a condition detection means, an exclusive condition detection means may be provided.

A third embodiment of the invention will now be described with reference to FIG. 4A.

Figure 4A:
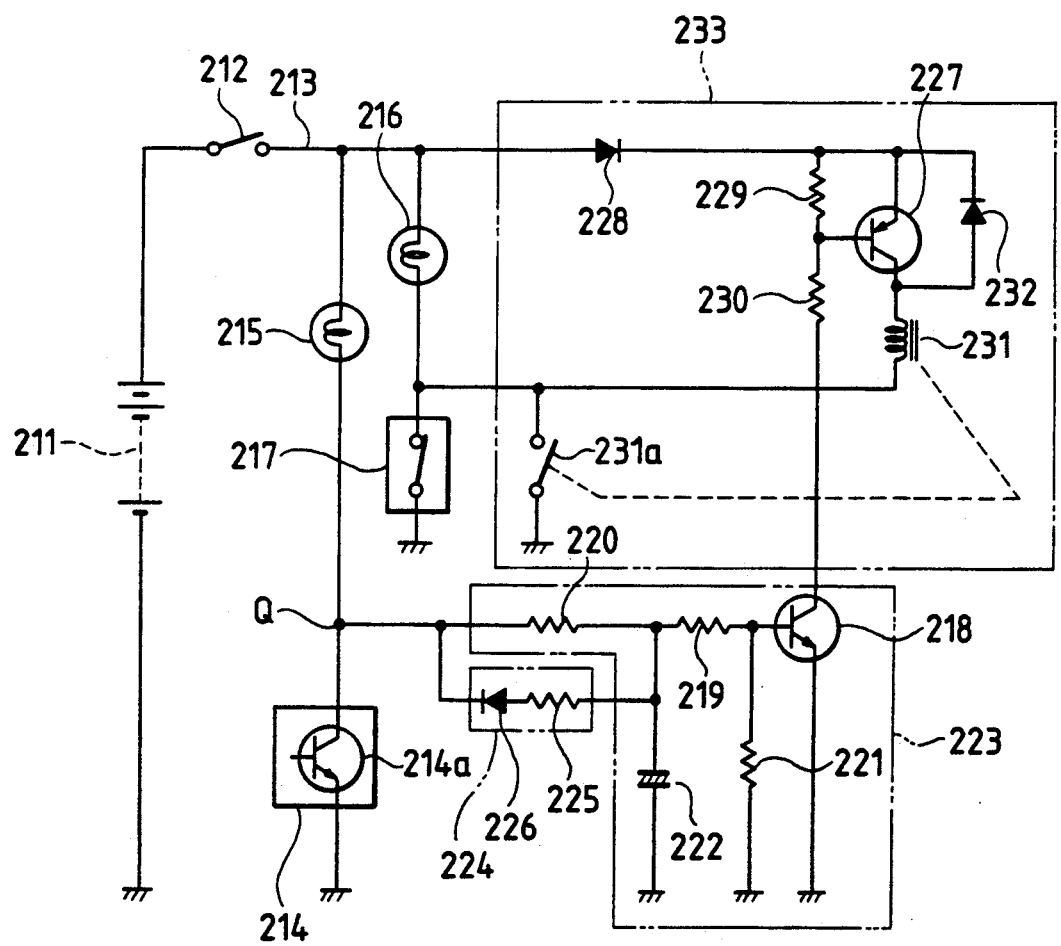
FIGS. 4A and 4B are circuit diagrams showing a third embodiment of the present invention.

FIG. 4A shows a schematic diagram of the third embodiment. A battery 211 mounted on a vehicle is grounded at a negative terminal and is connected at a positive terminal to a dc power line 213 via an ignition switch 212. A charge lamp controller 214 serves as a condition detecting means and the collector of a transistor 214a at the output stage acts as an output terminal Q which is connected to the dc power line 213 via a charge lamp 215.

When the power is supplied by the ignition switch 212 to the charge lamp controller 214, the charge lamp controller 214 detects the rotation of engine to turn a transistor 214a off so as to turn the voltage at the output terminal Q from the ground level to the positive terminal voltage of the battery 211. The voltage outputted from the output terminal Q is referred to as a detection signal. A warning lamp 216 serves as an alarm means and is connected at its one end to the dc power line 213 and at its other end to ground via an oil-pressure switch 217. The oil pressure switch 217 is opened when the circulation pressure of engine oil exceeds a predetermined level after the engine is started.

A NPN transistor 218 is grounded at its emitter and the base thereof is connected to the output terminal Q of the aforementioned charge lamp controller 214 via resistors 219 and 220 while also being grounded through a resistor 221. A charging capacitor 222 is connected between the ground and the junction point between the resistors 219 and 220. The above-described connection completes a signal-delaying circuit 223. When a signal of an H level is supplied to the signal-delaying circuit 223 from the output terminal Q of the charge lamp control 214, the signal-delaying circuit 223 begins to charge the capacitor 222 through the resistor 220, then capacitor 222 supplies a base bias voltage to the transistor 218 after elapse of a predetermined time (e.g., about 1-5 seconds). When the transistor 218 turns on and the collector thereof goes low, this condition refers to the condition of outputting of an enable signal. A discharge circuit 224 serves as an initialization means and is of the construction in which a series circuit of a resistor 225 and a diode 226 of the polarity shown is in parallel with the resistor 220. When the transistor 214a of the charge lamp controller 214 turns on, the discharge circuit causes the capacitor 222 in the signal-delaying circuit 214 to discharge in a short time (e.g., 0.1 to 0.5 seconds).

A PNP type transistor 227 is connected at an emitter to the dc power line 213 through the reverse-current blocking diode 228 of the polarity shown, and a base of the transistor 227 is connected through a resistor 229 to the emitter while also being connected to the collector of the transistor 218 via a resistor 230. The collector of the transistor 227 is grounded via a relay 231 and a normally open relay contact 231a. The junction point between the relay 231 and the relay contact 231a is connected to the junction point between the oil-pressure switch 217 and the warning lamp 216. A zener diode 232 of a polarity shown is inserted between the emitter and collector of the transistor 227 to protect the transistor. The above-described circuit connection completes a warning control circuit 233.

The operation of the third embodiment will now be described.

With the ignition switch 212 turned on, since the circulation pressure of engine oil is below a predetermined level when the engine is not operating, the oil pressure switch 217 is turned on, which causes the battery 211 to energize the warning lamp 216 through the ignition switch 212 and the oil pressure switch 217. Thus, the warning lamp 216 lights up. Due to the fact that the engine is not operating, when the output transistor 214a is on, the output terminal Q of the charge lamp controller 214 is at the L level, thereby charge lamp 215 is also energized to light up. At this time, the capacitor 222 is not charged since the output level is L, thus, the transistor 218 is off. This causes the transistor 227 in the warning controller 233 to be off.

With the above-described condition, if the engine is started and the circulation pressure of engine oil is normal, the charge lamp controller 214 detects the rotation of engine to cause the output transistor 214a to turn off so as to output the H level from the output terminal Q, which deenergizes the charge lamp 215 to light out. Since the output terminal Q of the charge lamp controller 214 goes high, the capacitor 222 of the signal-delaying circuit 223 begins to be charged through the resistor 220. Although a small current flows through the charge lamp 215, the current is too small for the lamp to light up. After elapse of predetermined time, when the capacitor 222 is charged up sufficiently to supply a drive voltage to the base of the transistor 218, the transistor 218 turns on to turn the collector voltage to the L level. As a result, the base of the transistor 227 in the warning control circuit 233 is supplied a drive voltage, which makes the transistor 227 ready to operate. In other words, the transistor 227 will be on so that a current flows through the transistor 227 when a voltage is applied between the emitter and collector. Before the warning control circuit 233 becomes ready to operate, the oil-pressure switch 217 detects that the circulation pressure of engine oil has exceeded a predetermined level, which stops the energization of the warning lamp 216. During which, the oil pressure switch 217 may open and there is no possibility of malfunctioning of the warning control circuit 233 because a predetermined time has not elapsed yet.

Thus, when the circulation pressure decreases due to the decreased amount of engine oil, the oil-pressure switch 217 turns on.

Thus, the warning lamp 216 is energized to light up while at the same time the transistor 227 in the warning control circuit 233 is applied a voltage across emitter and collector through a relay 231. This causes the transistor 227 to turn on, which in turn causes the relay 231 to be energized to close the relay contact 231a. The relay contact 231a also provides a electrical path for the warning lamp 216. While the transistor 218 in the signal-delaying circuit 223 is in the on state, the transistor 227 is also held in the on state, so that the relay contact 231a is held in the on state to permit the relay 231 to remain energized. That is, once the relay 231 remains energized, even if the oil-pressure switch 217 fluctuates back and forth between its on and off positions, the warning lamp 216 remains on without regard to the chattering of the switch 217. Thus, even if the oil-pressure switch 217 undergoes the chattering problem, the warning lamp 216 will not intermittently light up and light out, ensuring that the user is warned of the decreased circulation pressure of engine oil.

While the aforementioned warning control circuit 233 performs the warning operation, if the engine stops due to engine failure, the transistor 214a in the charge lamp controller 214 turns on to turn the output terminal Q to the L level. This permits the energization of the charge lamp 215 to light up while at the same time the capacitor 222 in the signal-delaying circuit 223 discharges through the discharge circuit consisting of the resistor 225, diode 226, and transistor 214a. Then, the transistor 218 in the signal-delaying circuit 223 turns off promptly, as well as the transistor 227 in the warning control circuit 233 turns off.

As a result, the relay 231 is deenergized to release it from its self holding condition, causing the relay contact 231a to become open to cut the electrical path to the warning lamp 216. In the mean time, the oil-pressure switch 217 turns on due to the decreased circulation pressure of engine oil to provide the warning lamp 216 with an electrical path. Thus, the warning lamp 216 will light up just as before the engine is started. Therefore, when the user restarts the engine immediately after the engine stops, the warning control circuit 233 will have released the relay contact 231a from its on condition, ensuring that the engine is started from initial condition and the apparatus is easy to use.

Figure 4B:
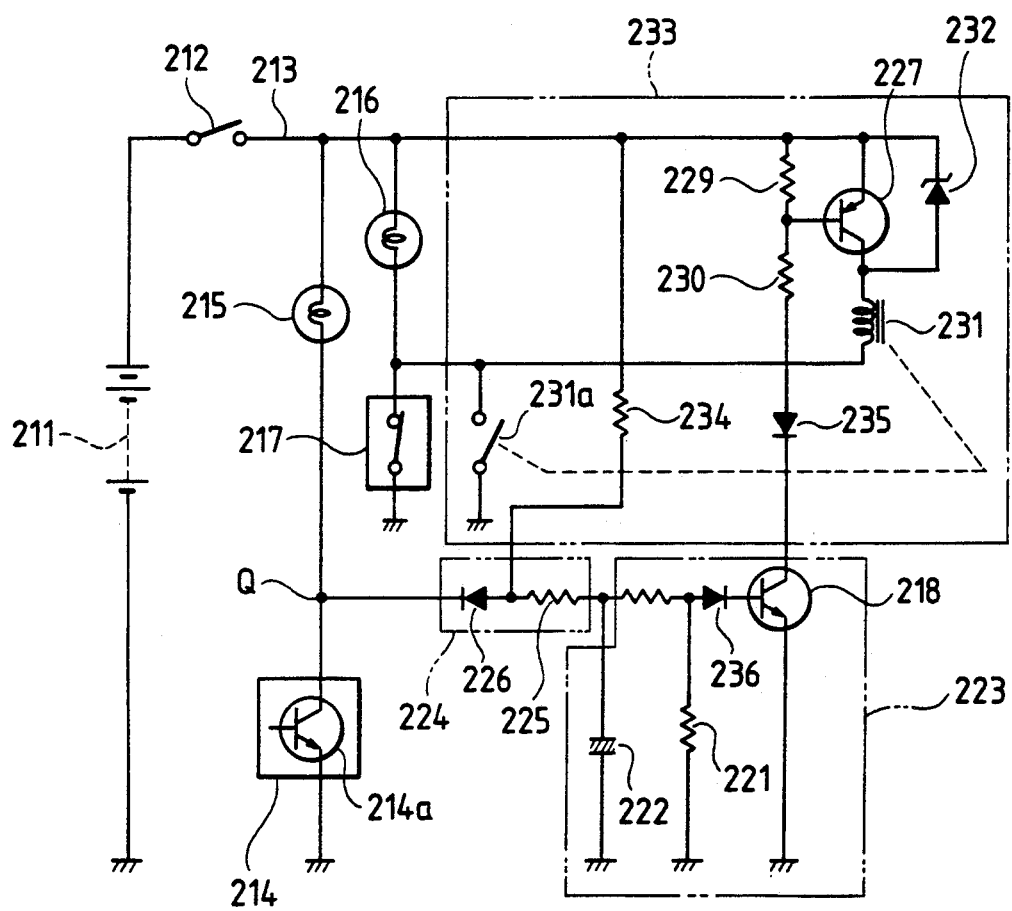

FIG. 4B shows a modification of the third embodiment. The modification is the same as the previously mentioned third embodiment except that the resistor 220 is removed and, instead, the resistor 234 is connected between the dc power line 213 and the junction point between the diode 226 and resistor 225. In the modification, a reverse-current blocking diodes 235 and 236 of the polarity shown are inserted into the base and collector of the transistor 218, respectively.

According to the modification, when the output terminal Q turns to the H level after the engine is started, the capacitor 222 in the signal-delaying circuit 223 is charged through the resistors 234 and 225, thus providing the same operation and effects as the previously mentioned third embodiment. By this arrangement, even when a trouble happens to the charge lamp 215, the capacitor 222 is not affected its charging operation.

In the modification, while the same charge lamp controller 214 is used as a condition detecting means, the condition detecting means may be formed of other exclusively provided means.

The aforementioned first through third embodiments have been described with respect to the signal-delaying circuits 22, 125, 223 in which the delay means takes the form of capacitors 21, 122, 222. Modification may be made within the scope of the invention, for example, a timer circuit may be used to generate the delay time.

As described above, the first oil pressure warning apparatus for automobiles according to the present invention is constructed such that with the engine operating, the delay means outputs an enable signal to the warning control circuit a predetermined length of time after the oil-pressure switch turns off, and thereafter when the oil-pressure switch turns on, the warning control means supplies power to the alarm means and continues to supply power while the main power is turned on.

The second oil pressure warning apparatus for automobiles according to the present invention is of the construction in which the condition detecting means outputs a detection signal after the engine is started, and the detection signal is supplied to the delay means which in turn outputs an enable signal to the warning control circuit after elapse of a predetermined time. With the enable signal supplied thereto, the warning control circuit provides the alarm means with a electrical path through a switching element in response to the inverted-level signal which is outputted when the oil-pressure switch turns on and maintains the electrical path while the enable signal is supplied thereto.

The third oil pressure warning apparatus for automobiles according to the present invention is of the construction in which the condition detecting means outputs a detection signal after the engine is started, and the detection signal is supplied to the delay means which in turn outputs an enable signal to the warning control circuit after elapse of a predetermined length of time. With the enable signal supplied to the warning control circuit, the warning control circuit supplies power to the alarm means when the oil-pressure switch turns on and thereafter continues to supply power to the alarm means while the enable signal is supplied to the warning control circuit. When the condition detection signal is shut off, the initialization means causes the delay means to immediately shut off the enable signal.

According to the above-described oil pressure warning apparatuses of the invention, even if the oil-pressure switch undergoes chattering when the engine is started, the warning control circuit is prevented from malfunctioning. When the oil-pressure switch fluctuates back and forth between its on and off positions due to the fact that the circulation pressure of engine oil while the engine is operating, the alarm means will operate without fluctuation, ensuring that the user is warned of the decreased circulation pressure of engine oil.

When the engine stops, the apparatus is immediately reset to its initial condition, thereby preventing the alarm means from continuously being supplied with power by the warning control circuit.

What is claimed is:

1. An oil-pressure warning apparatus for automobile engines comprising:
   an oil-pressure switch, said oil-pressure switch being activated to a conductive state when a circulation pressure of engine oil decreases below a predetermined level;
   alarm means for indicating a drop in the circulation pressure of the engine oil in accordance with the conductive state and a non-conductive state of said oil-pressure switch after a main power supply is turned on;
   delay means for producing a enable signal after a predetermined length of time has elapsed from when said oil-pressure switch is deactivated to the non-conductive state;
   a warning control circuit for energizing said alarm means when said oil-pressure switch is activated to the conductive state while said enable signal is supplied from said delay means to said warning control circuit, said warning control circuit continuing to energize said alarm means while said main power supply means turned on.

2. An oil-pressure warning apparatus as claimed in claim 1, wherein said delay means includes an NPN transistor having a first collector, a first emitter which is grounded and a first base grounded through a first resistor and a charging capacitor placed between a ground and the first base of the NPN transistor; and wherein said warning control circuit includes a PNP transistor having a second collector, a second emitter connected to the main power supply, and a second base connected to said second emitter via a second resistor, said second base being connected to said first collector of said NPN transistor via a third resistor, said second collector of said PNP transistor being grounded through a relay and a normally open relay contact.

3. An oil-pressure warning apparatus for automobile engines comprising:

an oil-pressure switch, said oil-pressure switch being activated to a conductive state when a circulation pressure of engine oil decreases below a predetermined level;

alarm means for indicating a drop in the circulation pressure of the engine oil in accordance with the conductive state and a non-conductive state of said oil-pressure switch after a main power supply is turned on;

condition detecting means for detecting rotation of an engine, said condition detecting means supplying a detection signal;

delay means for producing an enable signal after a predetermined length of time has elapsed from when said detection signal is supplied from said condition detecting means;

a warning control circuit for energizing said alarm means when said oil-pressure switch is activated to the conductive state while said enable signal is supplied from said delay means to said warning control circuit, said warning control circuit continuing to energize said alarm means while said main power supply remains turned on.

4. An oil-pressure warning apparatus as claimed in claim 3, wherein said delay means includes a fist NPN transistor having a first collector, a first emitter which is grounded, a first base connected to the detection signal of said condition detecting means via first and second resistors and grounded through a third resistor, and a charging capacitor placed between a ground and the first base of the first NPN transistor; and wherein said warning control circuit includes a PNP transistor having a second collector, a second emitter connected to the main power supply, and a second base connected to said first collector of said first NPN transistor via a fourth resistor; a second NPN transistor having a third emitter grounded via a fifth resistor, said second NPN transistor having a third collector connected to said second collector of said PNP transistor via sixth and seventh resistors, and said second NPN transistor having a third base grounded via an eighth resistor and connected to one end of said oil-pressure switch via a ninth resistor; and a third NPN transistor having a fourth emitter which is grounded, a fourth collector connected to one end of said oil-pressure switch and the third base of said second NPN transistor via the ninth resistor, and said third NPN transistor having a fourth base grounded via a parallel circuit of a tenth resistor and a capacitor and connected to the third collector of the second NPN transistor via an eleventh resistor.

5. An oil-pressure warning apparatus for automobile engines comprising:

an oil-pressure switch, said oil-pressure switch being activated to a conductive state when a circulation pressure of engine oil decreases below a predetermined level;

alarm means for indicating a drop in the circulation pressure of the engine oil in accordance with the conductive state and a non-conductive state of said oil-pressure switch after a main power supply is turned on;

condition detecting means for detecting rotation of an engine, said condition detecting means supplying a detection signal;

delay means for producing an enable signal after a predetermined length of time has elapsed from when said detection signal is supplied from said condition detecting means;

initialization means for causing said delay means to immediately stop said enable signal when said detection signal is shut off; and a warning control circuit for energizing said alarm means when said oil-pressure switch is activated to the conductive state while said enable signal is supplied from said delay means to said warning control circuit, said warning control circuit continuing to energize said alarm means while said main power supply is turned on.

* * * * *

UNITED STATES PATENT AND TRADEMARK OFFICE
CERTIFICATE OF CORRECTION

PATENT NO. : 5,107,248
DATED : April 21, 1992
INVENTOR(S) : Atsushi Koiwa et al.

It is certified that error appears in the above-identified patent and that said Letters Patent is hereby corrected as shown below:

Claim 1, column 12, line 42, before "enable" change "a" to --an--.

Claim 1, column 12, line 52, change "means" to --remains--.

Claim 4, column 13, line 25, change "fist" to --first--.

Signed and Sealed this

Fifth Day of October, 1993

Attest:

BRUCE LEHMAN

Attesting Officer

Commissioner of Patents and Trademarks